US 6,278,206 B1

(12) United States Patent
Yockey et al.

(10) Patent No.: US 6,278,206 B1
(45) Date of Patent: Aug. 21, 2001

(54) ELECTRICAL CONNECTION APPARATUS AND METHOD FOR CONNECTING AN ALTERNATOR STATOR

(75) Inventors: Steve Yockey; Richard Harris, both of Ann Arbor; Jayeson Fougner, Ypsilanti, all of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/605,934

(22) Filed: Jun. 28, 2000

(51) Int. Cl.[7] ................................................... H02K 11/00
(52) U.S. Cl. ........................ 310/71; 310/89; 310/254; 310/68 D; 310/45; 29/596
(58) Field of Search ........................ 310/254, 89, 71, 310/68 D, 43, 45, 42, 215; 29/596

(56) References Cited

U.S. PATENT DOCUMENTS

| | | | |
|---|---|---|---|
| 3,780,323 | * 12/1973 | Swain | 310/43 |
| 3,895,247 | * 7/1975 | Iwata et al. | 310/68 D |
| 3,970,881 | * 7/1976 | Sato | 310/68 D |
| 4,540,907 | * 9/1985 | Hagenlocher et al. | 310/68 D |
| 5,043,614 | 8/1991 | Yockey | 310/68 D |
| 5,233,246 | 8/1993 | Yockey | 310/68 D |
| 5,451,823 | 9/1995 | Deverall et al. | 310/71 |
| 5,508,871 | * 4/1996 | Shafer | 310/71 |
| 5,640,062 | 6/1997 | Yockey | 310/71 |
| 5,644,178 | * 7/1997 | Halm | 310/43 |
| 5,866,963 | 2/1999 | Weiner et al. | 310/68 D |
| 5,883,450 | 3/1999 | Abadia et al. | 310/71 |
| 5,991,184 | 11/1999 | Russell et al. | 310/68 D |

FOREIGN PATENT DOCUMENTS

WO99/17430   4/1999   (WO) .

* cited by examiner

*Primary Examiner*—Burton S. Mullins
(74) *Attorney, Agent, or Firm*—John R. Kajander

(57) ABSTRACT

An electrical machine such as an alternator (10) has a first housing (14) and a second housing (16) with a stator core assembly (18) therein. The stator core assembly has a plurality of windings (44) that are positioned within laminations (46). The windings have a first set of end turns (48), a second set of end turns (50), and winding ends 52. A respective first end cap (54) and a second end cap (56) are placed over respective end turns (48) (50). Potting material (58) is placed between the first end cap (54) and the first set of end turns (48) and the second end cap (56) and the second set of end turns (50). A stud assembly (60) having a stud housing (62) and a plurality of studs (64) is coupled to the first end cap. A bushing (68) is coupled to the studs (64) so that winding ends (52) may be coupled to a flat surface (70) thereof. The bushings (68) are also used to from an electrical connection between the rectifier bridge (36) and the stator core (42).

20 Claims, 4 Drawing Sheets

ELECTRICAL CONNECTION APPARATUS AND METHOD FOR CONNECTING AN ALTERNATOR STATOR

TECHNICAL FIELD

The present invention relates generally to rotating electrical machines and, more particularly, to a stator connection for a rotating electrical machine.

BACKGROUND

Electrical machines such as motors, generators, and alternators commonly have a stator. The stator is positioned inside a housing. Potting material is used to affix the winding end turns to the housing. Also in such configurations, the winding ends, that are electrically coupled to a rectifier bridge, are soldered to the rectifier bridge. One disadvantage of this configuration is that the stator cannot be removed from the housing once the stator is potted therein. Therefore, repair or remanufacturing a faulty alternator is impossible or cost prohibitive. Also, because the winding ends are soldered to the rectifier bridge, they also cannot be easily removed. Another disadvantage is that the process used to form the alternator assembly is complex, and labor intensive.

It would therefore be desirable to simplify the assembly process of the alternator as well as provide an alternator that is disassemblable for servicing.

SUMMARY OF THE INVENTION

It is therefore one object of the invention to provide a stator assembly that is detachable both electrically and physically from the alternator.

In one aspect of the invention, a stator assembly comprises a plurality of stator windings having a first set of end turns and a second set of end turns. The stator windings also have winding ends. A first end cap is disposed on the first set of end turns so that the plurality of winding ends extend therefrom. The second end cap is disposed on the second set of end turns. A thermally conductive material is disposed between the first end cap and the first set of end turns and the second end cap and the second set of end turns. A stud assembly having a plurality of studs and stud housing is coupled to the first end cap. A plurality of bushings disposed on a respective one of said plurality of studs is coupled to a respective one of the winding ends.

In a further aspect of the invention, a method of forming an electrical machine comprises the steps of:
placing a first end cap and a second end cap on end turns of a stator;
encapsulating the end turns of the stator with a thermally conductive material within the first end cap and the second end cap;
forming a stud assembly having a plurality of studs;
coupling the stud assembly to the first end cap;
placing a plurality of bushings on a respective one of said plurality of studs;
coupling a winding wire to a respective one of the bushings to form a stator assembly.

One advantage of the invention is that the stator is easily decouplable from the stator housing. Another advantage of the invention is that the end cap assembly is highly thermally conductive and therefore provides an efficient means for removing heat from the stator assembly.

Other objects and features of the present invention will become apparent when viewed in light of the detailed description of the preferred embodiment when taken in conjunction with the attached drawings and appended claims.

DESCRIPTION OF THE PREFERRED EMBODIMENT

Figure 1A:
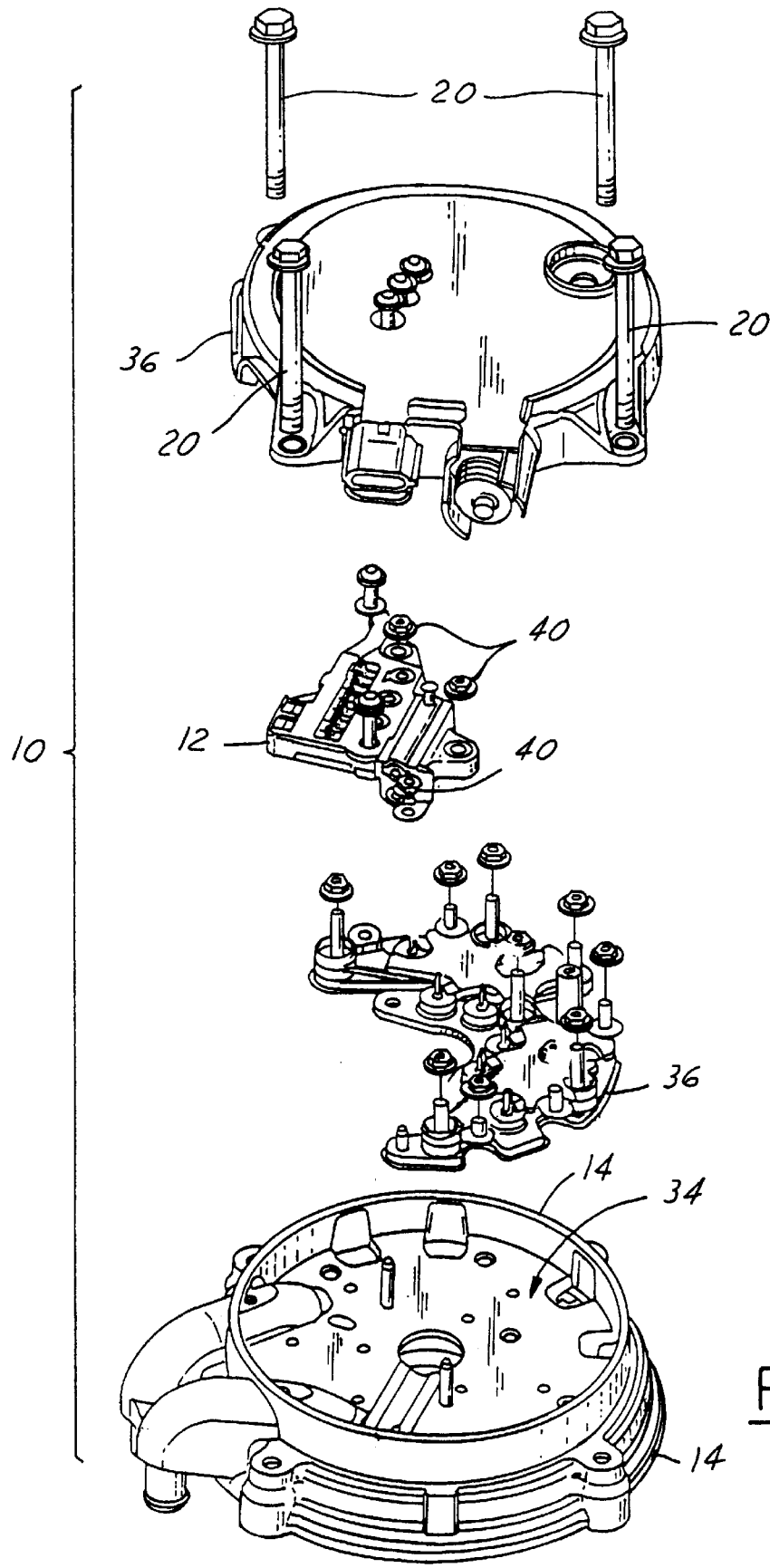
FIGS. 1A and 1B are exploded views of an alternator having a brush holder according to the present invention.

In the following figures the same reference numerals are used to identify the same components in the various views. The present invention is described with respect to an alternator or a generator. However, those skilled in the art will recognize that the present invention is equally applicable to other rotating electrical machines such as wiper motors, starter motors, and other rotating electrical machines.

Figure 1B:
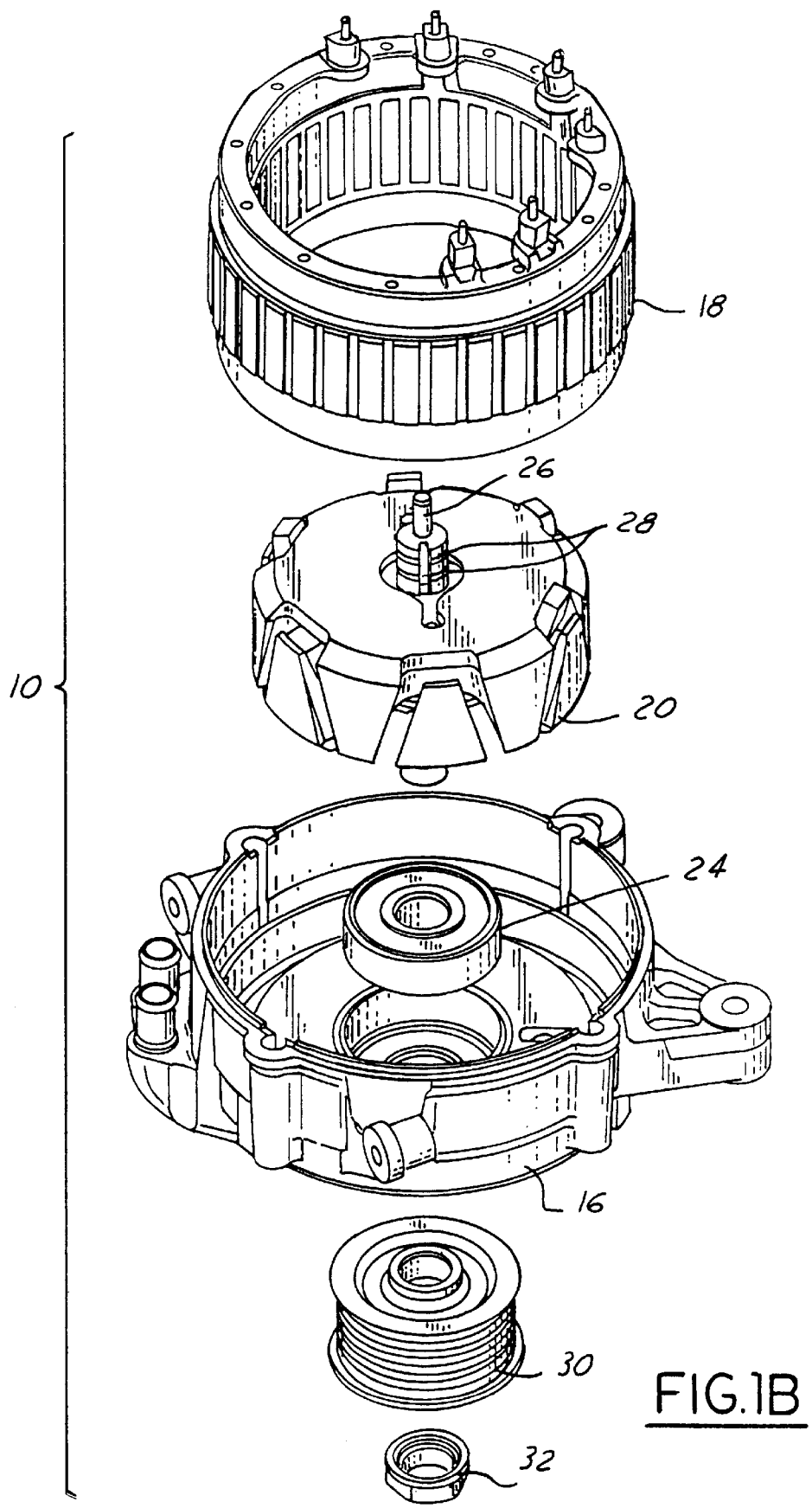

Referring now to FIG. 1, an alternator 10 has a brush holder assembly 12. Alternator 10 has a first housing portion 14 and a second housing portion 16 that are used to enclose the stator core assembly 18 formed according to the present invention. The first housing portion 14 and the second housing portion 16 are coupled together using fasteners 20. The first housing portion 14 and the second housing portion 16 support a rotor 22 with a bearing 24 in each housing portion 14, 16. As illustrated, rotor 22 is a Lundel type rotor. Rotor 22 has a shaft 26 that supports a pair of parallel spaced apart slip rings 28. The slip rings 28 are electrically coupled to a coil (not shown) within rotor 22. Slip rings 28 provide an electrical connection to a power source as will be further described below. A pulley 30 is coupled to shaft 26 by a nut 32. Pulley 30 couples to an engine or accessory drive belt of the engine so that as the engine crankshaft rotates the drive accessory belt, the rotor is rotated and causes the rotor to generate AC electrical within the stator 18.

First housing 14 has a recess 34 opposite stator 18. Recess 34 is used to house a rectifier bridge 36 and brush holder assembly 12. A cover 38 encloses the brush holder assembly 12 and rectifier bridge 36 within recess 34. Fasteners such as nuts 40 secure brush holder assembly 12 within recess 34. Also, fasteners 41 are used to couple the rectifier 36 bridge to the stator in a decoupleable manner as is described below.

Figure 2:
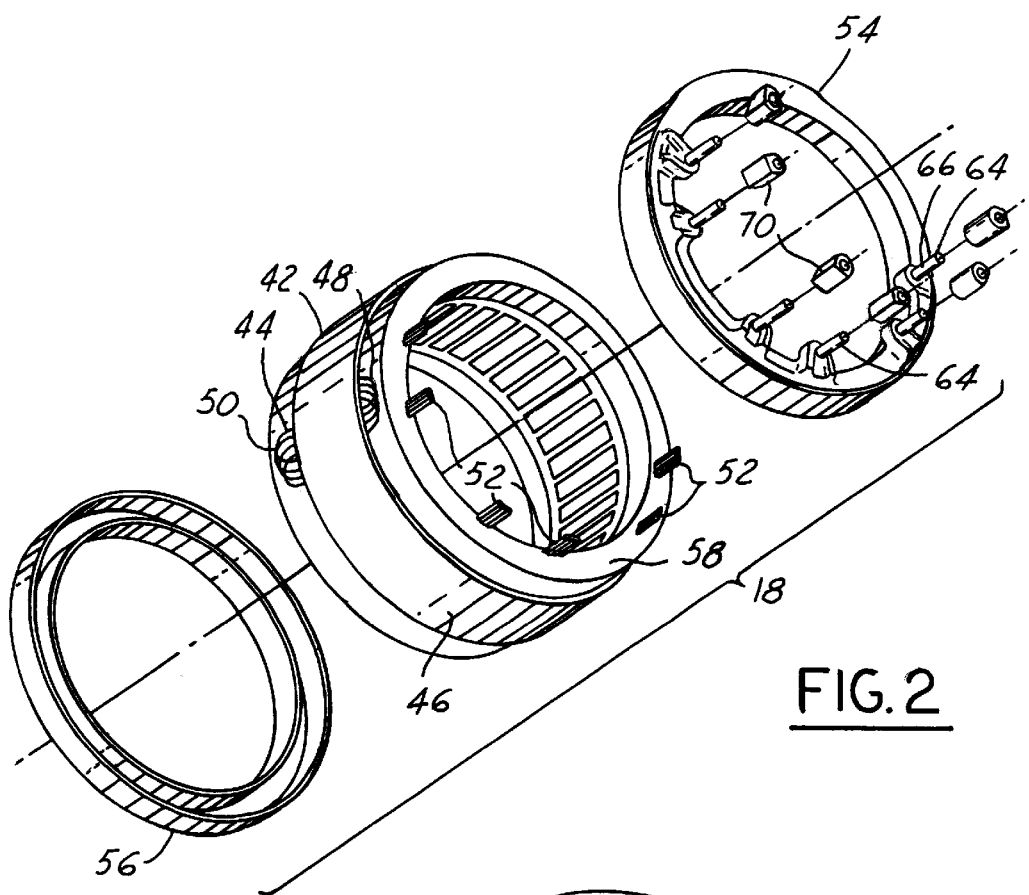
FIG. 2 is an exploded view of a stator assembly according to the present invention.

Referring now to FIG. 2, stator core assembly 18 has a stator core 42 that is comprised of a plurality of windings 44 and laminations 46 wound in a conventional manner. Windings 46 have a first plurality of end turns 48 and a second plurality of end turns 50. Windings 46 also have winding ends 52 that extend from stator core 42. As will be described below, winding ends 52 are used to electrically couple stator core 42 to other circuitry such as a rectifier bridge 36.

A first end cap 54 and a second end cap 56 are coupled to a respective set of end turns 48, 50. As will be further described below, winding ends 52 extend through first end cap 54. As illustrated, a thermally conductive potting material 58 is disposed around first set of end turns 48 and second set of end turns 50. As will be described below, potting material 58 is placed around the end turns 48, 50 after the first end cap 54 and second end cap 56 are placed on stator core 42.

A stud assembly 60 has a stud housing 62 having a plurality of studs 64 extending therefrom. The stud assembly 60 may be attached to first end cap 54 for example by heat staking stud housing 62 to first end cap 54. In the preferred embodiment, first end cap 54 and second end cap 56 are formed of aluminum having an epoxy coating thereon. The coated aluminum end caps provide excellent heat conducting properties. The coated surface prevents the stator wires from shorting thereon. Those skilled in the art would recognize that other materials may be used for end caps such as a polymer material. Studs 64 preferably have a threaded portion 66 that allows removable connection of the stud to rectifier bridge 36.

Studs 64 have a bushing positioned thereon. Bushing 68 is used to provide a welding pad on flat surface 70. Flat surface 70 allows the welding of winding ends 52 to the flat surface 70.

Figure 3:
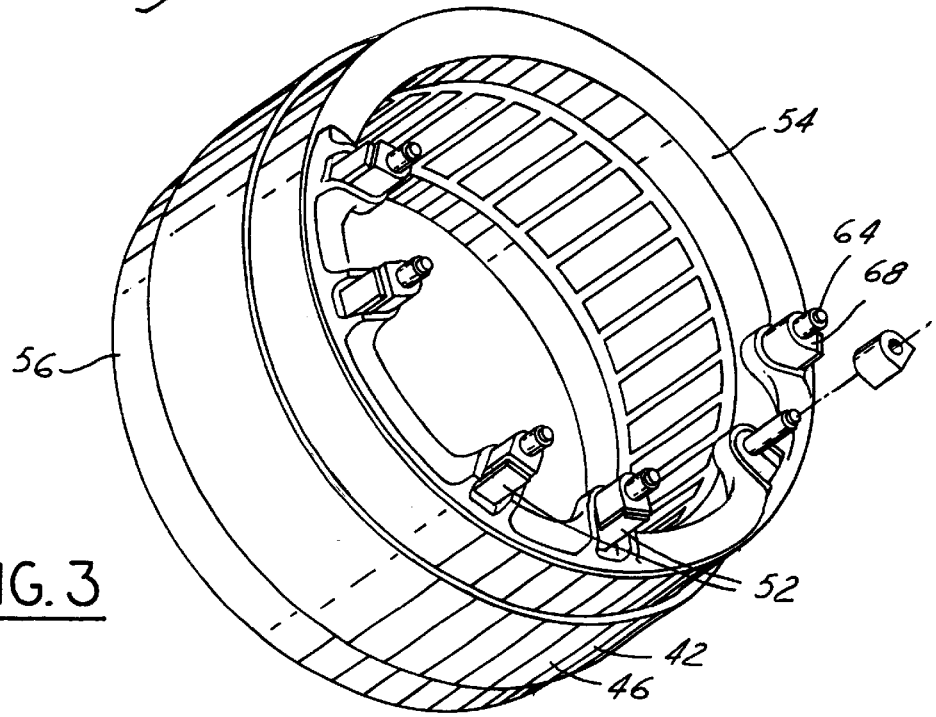
FIG. 3 is a perspective view of an assembled stator assembly according to the present invention.
Figure 4:
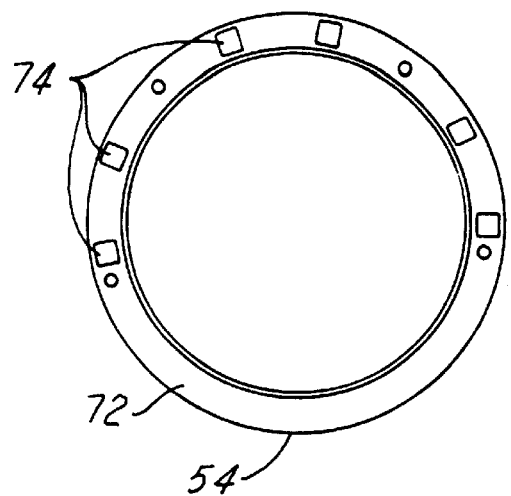
FIG. 4 is a top view of a first end cap of the stator assembly according to the present invention.

Referring now to FIG. 3, an assembled stator core assembly 42 is illustrated having winding ends 52 coupled to bushings 68. Referring now to FIG. 4, first end cap 54 has a generally cup shape and has a surface 72 used to enclose first end turns 48. Surface 72 has a plurality of openings 74 that allow the winding ends 52 to pass therethrough. Openings 74 receive a portion of the stud housing 62.

Figure 5:
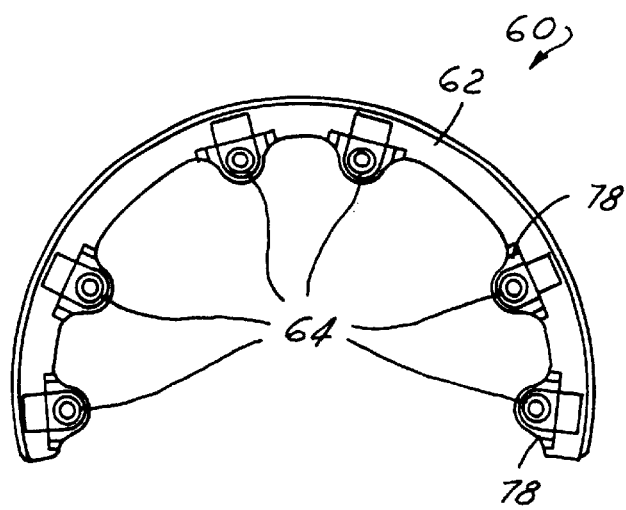
FIG. 5 is a top view of a stud assembly according to the present invention.
Figure 6:
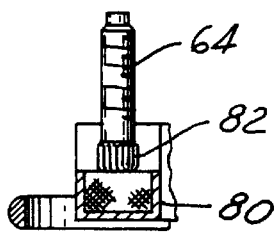
FIG. 6 is a cross-sectional view of a stud assembly along line 6—6 of FIG. 5.
Figure 7:
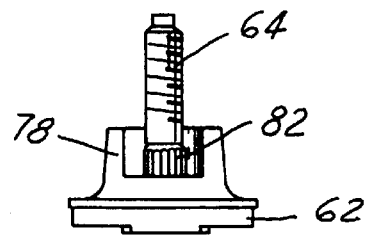
FIG. 7 is a partial cutaway view of a stud assembly according to the present invention.

Referring now to FIGS. 5, 6, and 7, stud assembly 60 is shown having a plurality of studs 64 extending from stud housing 62. Stud housing 62 has an integrally formed receiving channel 76 formed by wall 78 therearound. Walls 78 preferably are integrally formed with stud housing 62. Preferably, the studs 64 are positioned within stud housing 62 during the molding of the stud housing 62. Thus, a portion of studs 64 are overmolded therein. The receiving channel 76 is used to receive a portion of bushing 68.

Figure 8:
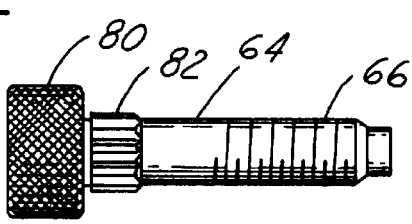
FIG. 8 is an elevational view of a stud according to the present invention.

Referring now to FIGS. 6, 7, and 8, studs 64 preferably have a first knurled portion 80 and a second knurled portion 82. First knurled portion 80 preferably has a diameter greater than second knurled portion 82. In one constructed embodiment, first knurled portion 80 was comprised of a diamond-shaped knurl and second knurled portion 82 was comprised of a straight knurl. First knurled surface 80 resists any movement of the stud 64 during the assembly process. Second knurled surface 82 resists movement of bushing 68 relative to stud 64 during the assembly process. As mentioned above, studs 64 also have a threaded portion 66 for receiving nuts 41 used to secure the rectifier bridge thereto.

In operation, the windings 44 of the stator core 42 are formed with the laminations 46 in a conventional manner. First end cap 54 and second end cap 56 are placed around end turns 48 and potting material 58 is injected therein to encapsulate the end turns 48,50. The first end cap 54 and the second end cap 56 are held in place by the potting material The stud assembly 60 is formed by forming the stud housing 62 around a plurality of studs 64. The stud assembly 60 may be coupled to the first end cap 54 before or after the potting material is injected therein.

Bushings 68 are placed over the studs 64 so that the second knurled surface 82 engages the inside of the bushings 68. The winding ends 52 extending through the first cap 54 are welded or otherwise coupled to the flat surface 70 of bushings 68. The stator core assembly 18 may then be placed, removably, in the housings 14,16. Rectifier bridge 36 is placed so that the studs 64 extend through openings in the rectifier bridge. Nuts 41 removably couple the rectifier bridge 41 to the studs 64. Thus, an electrical connection is formed between the stator core through the studs 64 and bushing 68.

The assembled stator core 42 within the first housing 14 and second housing 68 allow high thermal conductivity through the potting material 58 and first end cap 54 and second end cap 56. Heat generated within the windings 44 is removed from stator core 42 to be dissipated in the housings 14,16.

While particular embodiments of the invention have been shown and described, numerous variations alternate embodiments will occur to those skilled in the art. Accordingly, it is intended that the invention be limited only in terms of the appended claims.

What is claimed is:

1. A stator assembly for a rotating electrical machine comprising:
 a plurality of stator windings having a first set of end turns, a second set of end turns and plurality of winding ends;
 a first end cap disposed on said first set of end turns so that said plurality of winding ends extend therefrom;
 a second end cap disposed on said second set of end turns;
 a thermally conductive material disposed between said first end cap and said first set of end turns and between said second end cap and said second set of end turns;
 a stud assembly having a plurality of studs in a stud housing coupled to said first end cap; and,
 a plurality of bushings disposed upon a respective one of said plurality of studs, said plurality of bushings coupled to a respective one of the winding ends.

2. A stator assembly as recited in claim 1 wherein said thermally conductive material is composed of a thermoset.

3. A stator assembly as recited in claim 1 wherein said thermally conductive material is composed of a thermoplastic.

4. A stator assembly as recited in claim 1 wherein said first end cap and said second end cap are composed of epoxy coated aluminum.

5. A stator assembly as recited in claim 1 wherein said plurality of studs each comprise a first knurled portion for coupling the stud within the stud housing.

6. A stator assembly as recited in claim 1 wherein said plurality of studs comprise a second knurled portion for securing a respective one of said plurality of bushings thereon.

7. A stator assembly as recited in claim 1 wherein said studs have a threaded portion.

8. A stator assembly as recited in claim 1 further comprising a plurality of nuts coupled to a respective one of said studs.

9. An electrical machine comprising:
 a housing;
 a rectifier position within the housing;
 a stator assembly comprising;
  a plurality of stator windings having a first set of end turns, a second set of end turns and plurality of winding ends;
  a first end cap disposed on said first set of end turns so that said plurality of winding ends extend therefrom;

a second end cap disposed on said second set of end turns;

said first end cap and said second end cap removably coupled to said housing;

a thermally conductive material disposed between said first end cap and said first set of end turns and between said second end cap and said second set of end turns;

a stud assembly having a plurality of studs in a stud housing coupled to said first end cap; and, a plurality of bushings disposed upon a respective one of said plurality of studs, said plurality of bushings coupled to a respective one of the winding ends.

10. An electrical machine as recited in claim 9 wherein said thermally conductive material is composed of a thermoset.

11. An electrical machine as recited in claim 9 wherein said thermally conductive material is composed of a thermoplastic.

12. An electrical machine as recited in claim 9 wherein said first end cap and said second end cap are composed of epoxy coated aluminum.

13. An electrical machine as recited in claim 9 wherein said plurality of studs each comprise a first knurled portion for coupling the stud within the stud housing.

14. An electrical machine as recited in claim 9 wherein said plurality of studs comprise a second knurled portion for securing a respective one of said plurality of bushings thereon.

15. An electrical machine as recited in claim 9 wherein said studs have a threaded portion.

16. An electrical machine as recited in claim 9 further comprising a plurality of nuts coupled to a respective one of said studs.

17. A method of forming an electrical machine rising the steps of:

placing a first end cap and a second end cap on end turns of a stator;

encapsulating the end turns of the stator with a thermally conductive material within the first end cap and the second end cap;

forming a stud assembly having a plurality of studs;

coupling the stud assembly to the first end cap;

placing a plurality of bushings on a respective one of said plurality of studs;

coupling a winding wire to a respective one of the bushings to form a stator assembly.

18. A method as recited in claim 17 further comprising the step of coupling a rectifier to the bushing.

19. A method as recited in claim 17 wherein the step of coupling a rectifier comprises removably coupling the rectifier.

20. A method as recited in claim 17 wherein the step of placing a plurality of bushings comprises pressing the bushings on a knurled surface of the stud.

* * * * *